UNITED STATES PATENT OFFICE.

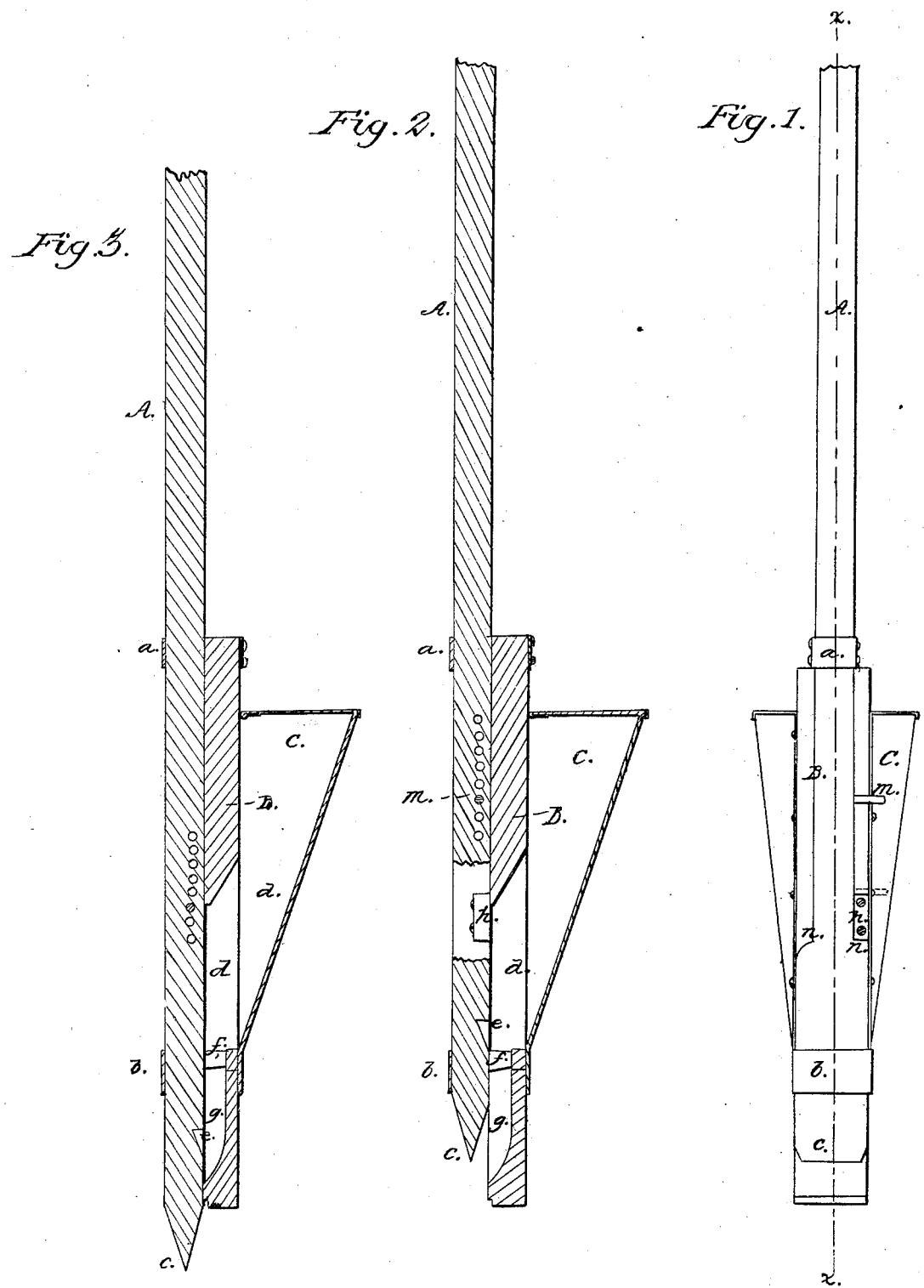

CHARLES H. DANA, OF WEST LEBANON, NEW HAMPSHIRE.

IMPROVEMENT IN SEED-PLANTERS.

Specification forming part of Letters Patent No. 11,641, dated September 5, 1854.

*To all whom it may concern:*

Be it known that I, CHARLES H. DANA, of West Lebanon, in the county of Grafton and State of New Hampshire, have invented a new and Improved Self-Acting Dibble for Planting Indian Corn and other Seeds; and I do hereby declare that the following is a full and exact description thereof, reference being had to the accompanying drawings, making part of this specification—

Figure 1 being a side elevation of the instrument in its position when raised from the ground; Fig. 2, a vertical section thereof in the line $x$ $x$ of Fig. 1, and Fig. 3 a similar section of the same in its position when inserted into the ground.

Like letters designate corresponding parts in all the figures.

The nature of my invention consists in constructing a dibble or shaft for planting seeds, which shall make the holes in the earth, and when being withdrawn therefrom shall, by means of a self-acting device attached to it, deposit the desired number of seeds into the holes just formed, arranged substantially as hereinafter set forth.

I employ a staff, A, of suitable size to be carried in and operated by the hand, and sharpened or beveled at the lower end to an edge, as shown at $c$ in the different figures, for the purpose of freely entering the ground. A bar, B, of suitable size—say twelve or fourteen inches in length—is made to slide a limited distance upon the lower end of said staff, being conveniently secured to the staff for that purpose by means of two metallic loops or bands, $a$ $b$. Its downward movement on the staff is limited by a button or projection, $h$, which strikes as it descends a shoulder, $n$, on said staff; and its upward movement thereon is limited by the same button striking a pin, $m$, passing through the staff, and made adjustable by a series of holes, $i$ $i$, &c., in the staff, in any one of which it may be inserted, according to the depth at which it is desired to form the holes in the ground. A seed-box, C, of convenient dimensions and form, is attached to one side of the sliding bar B, through which an aperture, $d$, extends from the lower part of said seed-box, so that the seed will sink down in contact with the staff. A brush, $f$, or its equivalent, arranged as represented in Figs. 2 and 3, extends across an aperture at the bottom of the seed-box, and prevents the seed from falling down into a small cavity, $g$, situated below it in the sliding bar. A small triangular cavity, $e$, in the side of the staff next to the seed-box, formed and arranged as shown in Figs. 2 and 3, and of sufficient capacity to contain the number of seed desired for each hill, is so placed in position that when the staff is raised from the ground, and consequently the sliding bar depressed to its lower limit on the staff, it will be above the brush $f$, as in Fig. 2, and allow the proper number of grains to fill it; but when the staff is inserted into the ground, and consequently the sliding bar is forced up to its upper limit on the staff, said cavity will descend below the brush $f$ and convey the seeds within it into the cavity $g$ below the brush, which by its elasticity yields and permits said seeds to descend without danger of clogging, but prevents other seeds from descending at the same time; and when the staff and sliding bar are in this position the said cavity $g$ is closed by the side of the staff, as shown in Fig. 3, and the seeds deposited in it are thus prevented from falling out till the staff is again drawn from the ground, at which moment, the sliding bar sinking below the staff again, the oblique sharpened end of said staff, coming opposite the cavity $g$, permits the seeds to fall therefrom; and they are then invariably directed into the hole just made by the withdraw staff by the oblique form of the bottom of the cavity $g$, as shown in Figs. 2 and 3. Hence the dropping part of the instrument is self-acting, and only requires the operator to force the staff down into the ground as far as the end of the sliding bar will permit, and then withdraw it and proceed to the next hill; and as he thus proceeds he may step upon each hill to cover the seeds with earth.

Although the above-described instrument is especially intended for planting with the hand, it may be attached to wheels in a radial direction, the sharpened portions $c$ $c$, &c., of the staffs projecting beyond the peripheries of the wheels, so that as they revolve they will operate the dibbles and plant the seeds in imitation of the hand movement. It is obvious that any number of the dibbles can thus be arranged on each wheel, so as to make the hills at the desired distances apart.

I am aware that a seed-planter like the following has been constructed, and therefore I do not claim it as my invention—viz., a seed-planter composed of a seeding-box immovably attached to a handle, and having a tube passing from the lower end of said handle downward through and some distance below the bottom of said box, and depositing seeds, by means of a hole in said tube, inside the box, and a movable stem with a seeding-recess in its side working reciprocatingly within and beyond the lower end of said tube by means of the alternate action of a spring at its upper end and the pressure of the ground against its lower end as the said planter is operated; but What I do claim as my invention, and desire to secure by Letters Patent, is—

1. My improved seed-planter, composed of the staff A and the reciprocating seeding-box and apparatus B C, arranged in such a manner that the reciprocating movement of the seeding-box and apparatus upon one side or face only of its staff will cause the seeds to be deposited by means of the measuring-cavity $e$ in the staff, in connection with the depositing-cavity $g$ and the brush or elastic partition $f$ of the seeding apparatus, or their equivalents, combined and operating with each other substantially as herein set forth.

2. The triangular measuring-cavity $e$ in the staff, in connection with the brush or elastic partition $f$ and the depositing-cavity $g$ of the seeding apparatus B C, arranged and operating to deposit the seeds by means of the reciprocating movement of the seeding-box, upon one side or face only of its said staff, substantially as herein set forth.

The above specification of my new and improved dibble for planting Indian corn and other seeds signed by me this 1st day of October, 1853.

C. H. DANA.

Witnesses:
  ROSWELL SARTWELL,
  HENRY GREEN.